United States Patent [19]
Rice et al.

[11] 3,935,434
[45] Jan. 27, 1976

[54] PRINTER CONTROL
[75] Inventors: Harry E. Rice, Van Nuys; John K. Rude, Burbank, both of Calif.
[73] Assignee: Technicolor, Inc., Hollywood, Calif.
[22] Filed: Mar. 4, 1963
[21] Appl. No.: 262,410

[52] U.S. Cl. ............ 235/92 CT; 355/14; 355/103; 235/92 R
[51] Int. Cl.² .................... G06M 3/02; G03B 33/10
[58] Field of Search ...... 235/61.7, 92 (29), 92 (21); 340/146.1 B; 356/71; 101/144; 95/1.1; 355/40–42

[56] References Cited
UNITED STATES PATENTS
2,121,061   6/1938   Townsend .............................. 40/53
2,338,014   12/1943   Sharp .......................... 235/92 (29)
2,916,988   12/1959   Cragg ................................. 101/144

*Primary Examiner*—Joseph M. Thesz
*Attorney, Agent, or Firm*—Lyon & Lyon

[57] ABSTRACT

This invention relates to a control system for a motion picture film printer and more particularly relates to a system for initiating and controlling various printer operations.

8 Claims, 3 Drawing Figures

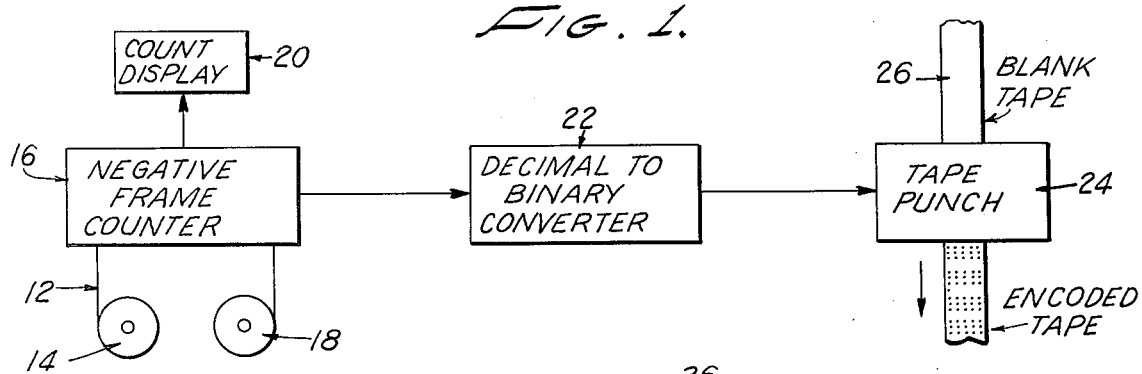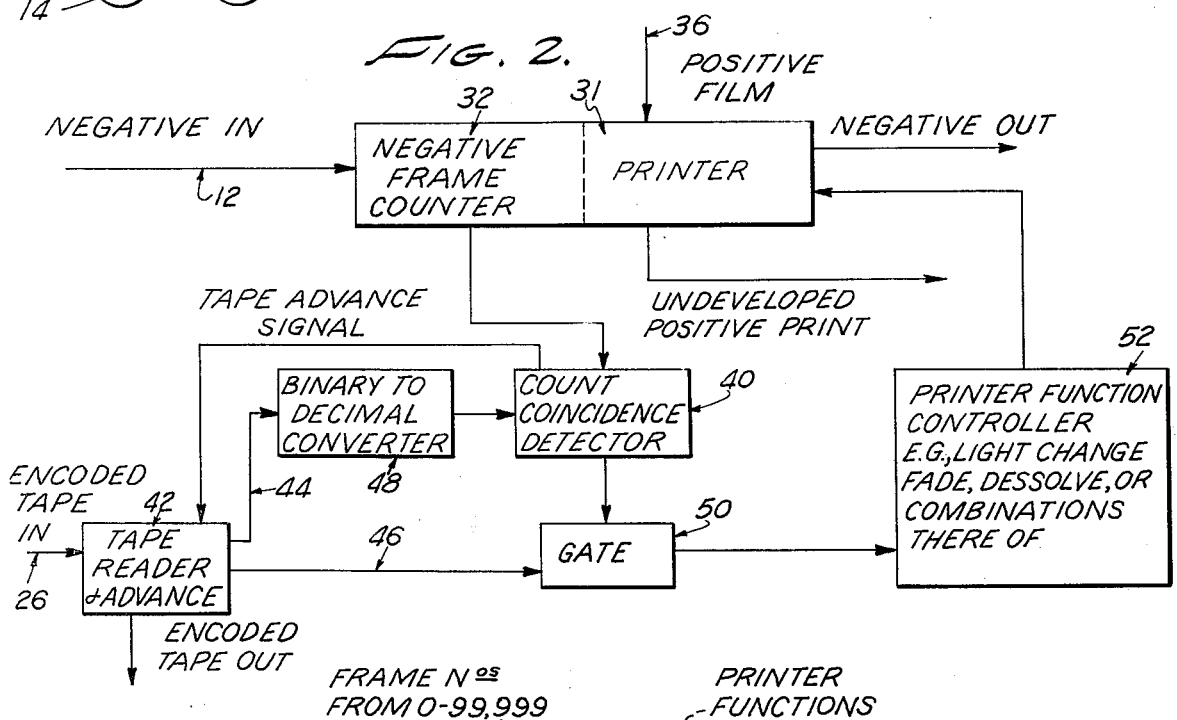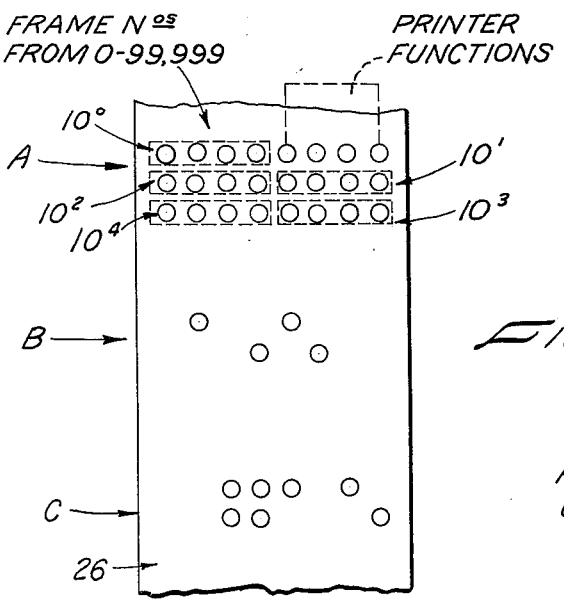

PRINTER CONTROL

In the printing of a positive motion picture film from a negative, it is necessary to operate the printer in different manners for different portions of the film. For example, it is sometimes necessary that less printing light be used for some scenes than for others or that scenes be faded, dissolved or deleted. These various printer operations are referred to herein as printer functions. The time at which these changes in printer operation are to occur are predetermined by the film editors or other experts who review the negative and chronologically list the changes in printer functions and the negative frame at which they are to be initiated.

Generally, a printer function controller is provided with suitable control information encoded on cards or a tape and acts to alter the operation of the printer in accordance with this information. In presently available systems, the operation of the printer function controller is controlled or initiated by cuing devices formed on the negative film being printed. Such cuing devices commonly take the form of notches cut in the edge of the negative which operate an electrical switch, conductive ink marks on the negative which complete a circuit, or a conductive or inductive metal tape or rivet mounted on the negative whose encoded information triggers an electrical circuit. In each case the cuing devices actuate the controller to change printer operation and advances the tape or card in the printer function controller so that a new set of encoded information is sensed or read by the controller and used to vary printer operation upon the occurrence of the next cuing signal.

The cuing systems just discussed all have disadvantages which limit the desirability of their use. The use of notches seriously weakens the mechanical strength of the negative and thus subjects it to frequent tearing with the consequent disruption of the printing process. Moreover, the notches once cut are permanent, and hamper any attempt to re-edit the negative as is often desired. The conductive ink loses conductivity over a period of time and is subject to removal during the handling of the negative. Such conductive cue marks are also subject to failure due to corrosion which causes loss of contact. The metal tapes are difficult to secure to the film, and usually must be designed for an optimum printing rate in order to properly operate the cue sensing device. In practice, the printing rate varies over a considerable range, causing the cue sensing device to fail, especially with the inductive type pickups. The various electrical type cuing devices, like the notches, are also unsatisfactory because of the difficulties they present when it is desired to re-edit the negative. The number of operations that can be handled by such systems is limited by the physical characteristics of the negative. A system using notches, for example, is limited to controlling only two operations, as only two notches, one on each edge of the negative, can be provided.

According to the present invention, an improved cuing system has been provided which does not require that the negative itself be in any way involved in producing the cuing signal. The cuing signals are provided on a separate information storage medium which is provided with information relating to both the function which is to occur and the frame at which time it is to occur. This information can then be used in conjunction with a negative frame counter at the printer to produce signals for actuating the function controller in the proper manner. The invention thus enables the printing process to proceed without damage to the negative and provides a permanent record of the manner in which the negative was printed. If it is desired to re-edit the negative, this can easily be done on a separate storage medium and this medium then used to control the printer. The same negative may thus be used to provide a plurality of different positive prints, such as are required for movie theater and television use. Furthermore, since the cuing information is contained on a separate storage medium, there is no physical limitation to the amount of information that may be used, and thus any desired number of printer operations may be handled by this system.

Although reference is made to printing a positive from a negative, it is readily apparent that insofar as the printer is concerned, the operation could be printing a negative from a positive, or making matrices for use in an imbibition process. The terms negative and positive should be considered interchangeable for the purpose of this invention.

It is therefore an object of the present invention to provide a control system for a motion picture film printer.

It is also an object of the present invention to provide a method for printing a motion picture film.

It is another object of the present invention to provide a cuing system for controlling the operation of a motion picture film printer.

It is a further object of the present invention to provide a method of cuing a motion picture film printer so that it performs a desired sequence of operations.

It is a still further object of the present invention to provide a cuing system for a motion picture film printer in which the cuing information is contained on an information storage medium other than the negative.

These and other objects and advantages of the present invention will become more apparent upon reference to the accompanying description and drawings in which:

FIG. 1 is an electrical block diaphragm of a system for encoding cuing information on a tape;

FIG. 2 is an electrical block diaphragm of a system for controlling a motion picture film printer by means of the encoded tape of FIG. 1; and FIG. 3 is a plan view of a typical tape which may be used in the present invention and the manner in which the cuing information is stored thereon.

Referring now to FIG. 1, the negative film 12 is wound on a suitable reel 14 and is passed through a negative frame counter 16 to a pickup reel 18. The pickup reel 18 is usually hand driven by a crank and gear assembly to permit visual inspection by the operator and to allow the film to be stopped at the preselected cue points. The negative frame counter 16 has a first output, which may be electrical or mechanical, and which is fed to a count display 20 as is conventional. The count display 20 indicates to the operator a number corresponding to the sequential number of the frame located at an index point on the editing table.

The negative frame counter 16 has a second output which is fed to a decimal to binary converter 22 which converts the counter output to binary form. If desired, of course, the decimal to binary converter 22 can be incorporated as a part of the negative frame counter 16. The output of the decimal to binary converter 22 is fed to a conventional tape punch 24. When a desired frame number is registered, the operator actuates the tape punch 24 and it makes suitable holes in the tape indicative of the negative frame number counted from a fixed index at the lead end of the reel. The tape punch is also actuated at this time to establish on another area of the tape the type of function which the printer is to perform, as previously determined by the film editors. The tape 26 may be constructed of paper, plastic, or any of the other well known materials used in the manufacture of tapes of this type.

Referring now to FIG. 2, there is shown a system for controlling a printer in response to the information encoded on the tape by the system of FIG. 1. The negative 12 is fed through a negative frame counter 32 located in or adjacent to a printer 34. A positive film 36 is also fed to the printer which produces an undeveloped positive print corresponding to the negative 12. The negative frame counter 32 has an electrical output which is fed to a first input of a count coincidence detector circuit 40. This detector circuit may take the form of one of the suitable circuits disclosed in the book Waveforms, published in 1949 by the McGraw-Hill Co. as Volume 19 of the "Radiation Laboratory Series", in the chapter beginning at page 364.

The encoded tape 26 is fed into a tape reader and advance 42 of the type well known in the art for producing an output signal in response to information contained on a tape, for example, one utilizing a source of light, and photosensitive detectors for reading punched holes in a tape. As the tape has two independent sets of information established thereon, two separate reading elements are necessary. The reader thus producing two output signals, the first signal 44 being indicative of the negative frame number and the second signal 46 being indicative of the printer function.

The first output 44 of the tape reader 42 is fed to a binary to decimal converter 48, the output of which is fed to a second input of the count coincidence detector circuit 40. A first output of the count coincidence detector circuit 40 is applied to the gating input of a gate 50. In a typical example, gate 50 consists of a plurality of relays actuated by the coincidence detector circuit 40 and tape reader output 46 to transmit the signal representing the selected printer function or functions to controller 52. Multiple gating arrangements of this and other types are well known in the prior art. A second output of the count coincidence detector circuit 40 is fed back to the tape reader and advance 42 to cause the encoded tape 26 to be advanced to its next position.

The second output 46 of the tape reader 42 is fed to the input of the normally closed gate 50. Upon the occurrence of an output signal from the coincidence circuit 40, however, the gate 50 is opened, and the output 46 of the tape reader 42 is passed to the input of a printer function controller 52 which utilizes the information to produce an output signal which is used in the conventional manner to control the operation of the printer 34.

The manner in which the tape 26 may be encoded is shown in FIG. 3. In this figure, the tape is shown to have three encoded sections, indicated at A, B and C. In actual practice, of course, the tape could be provided with any desired number of encoded sections, each section containing two sets of information, the first relating to the negative frame number and the second relating to the printer function. The Section A shows the tape with all possible holes punched. As can be seen, there are three rows of holes, each row having eight holes. In a typical application, four of the holes in the first row and all of the holes in the second and third rows are used for negative frame number information and the remaining four holes in the first row are used for printer function information. In the type of binary counting system used and shown, if a punched hole indicates a one and no hole a zero, zero is represented by 0000, the number one by 1000, two by 0100, three by 0010, four by 1100, five by 0110, six by 1110, seven by 0001, eight by 0011 and nine by 1111. By use of this system up to 99,999 frames may be counted by use of the decade representation illustrated in FIG. 3.

The four holes indicating printer function information may be coded in any suitable fashion. For example, if a hole indicates a one and no hole a zero, a light change may be indicated on the tape as 0000, a fade as 1000, a scene deletion as 0100, a zero cut as 1100, a light change and fade as 1010 and so forth. Thus, in FIG. 3, the section B contains the information that a fade is to take place at the 722nd frame, while section C calls for a light change and fade at the 878th frame.

In the operation of the system of FIG. 2, the encoded tape 26 is threaded into starting position in the tape reader 42. The tape 26 is positioned in the tape reader so that the holes encoding the first frame count at which a printer function is scheduled to occur are read by a first set of photoelectric reading elements and the holes encoding the printer function information are read by a second set of reading means. Thus, before the printer is started, the tape reader has a first binary output representing a frame count, and a second binary output 46 representing the printer function. The negative 12 is then threaded into the printer 34 and is positioned so that the negative frame counter 32 reads zero.

The frame count from the negative frame counter 32 is fed to the coincidence detector 40 which also receives the output 44 from the tape reader 42, as converted to a decimal signal by the converter 48. Thus, when the printer is ready to start, the coincidence detector 40 contains a zero frame count from the negative and a first frame count from the tape 26, the coincidence circuit 40 has no output, and the gate 50 is closed. The printer is now started.

When the negative frame counter 32 produces a frame count equal to the count in the coincidence detector 40 from the tape reader 42, the coincidence detector produces an output signal which is applied to the gate 50,, opening the gate. The information cntained in the output signal 46 may now pass to the printer function controller 52 which operates in response to this signal to alter the operation of the printer 34 in the preselected manner. The coincidence detector 40 also produces an output signal to the tape reader and advance 42 which causes it to advance the encoded tape 26 to the next encoded section on the tape. As the two inputs to the coincidence detector 40 are now dissimilar, the gate 50 is closed and information cannot pass to the printer function controller 52 until the next coincidence occurs.

From the foregoing description it can be seen that an improved system and method has been provided for cuing a printer function controller. The present system and method requires no mutilation or alteration of the film negative and thus greatly reduces the amount of handling that the negative is subject to, thereby eliminating a common cause of damage to the negative. The cuing information is contained on a completely independent medium, and thus any number of different control patterns may be established for a single negative. The various patterns may be easily and quickly substituted by relatively unskilled personnel so that a number of differently edited films may be printed from the same negative without the negative itself being touched.

While FIG. 1 shows a decimal to binary converter, if frame counter 16 has a binary output as well as digital count display, no converter is necessary. Likewise in FIG. 2, converter 48 would not be needed if frame counter 32 provided a binary output.

While the present invention has been illustrated and described in connection with a punched tape and photoelectric tape reading means, it should be understood that any suitable information storage medium and reading or decoding device could be used. The medium could, for example be a magnetic tape, magnetic numbers in digital form on tape, printed numbers which are optically scanned, or a stack of encoded cards, each card containing one or more sets of information. The invention may be embodied in other specific forms not departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a system for cuing and actuating a controller by means of information relating to a printer function and the negative frame number at which it is to occur encoded on a storage medium, said controller controlling the functioning of a motion picture printer printing a positive print from a negative, the combination comprising:
   means for passing said negative through said printer;
   a counter for counting the negative frames entering said printer and producing an output signal indicative of the number thereof;
   first means coupled with said storage medium for producing an output signal indicative of the negative frame number information encoded thereon;
   a coincidence detector coupled to said counter and said first means and responsive to the output signals therefrom to produce an output signal upon a coincidence thereof;
   second means coupled with said storage medium for producing a control signal indicative of the printer function information encoded thereon; and
   a gate having first and second inputs and an output, said first input being coupled with the output of said coincidence detector, said second input being coupled with the output of said control signal producing means, said output being connected to said controller, said gate being operative to pass said control signal to said controller upon the occurrence of a signal at said first input.

2. In a system for cuing and actuating a controller by means of information relating to a printer function and the negative frame number at which it is to occur encoded on a storage medium, said controller controlling the functioning of a motion picture printer printing a positive print from a negative, the combination comprising:
   means for passing said negative through said printer;
   a counter for counting the negative frames entering said printer and producing an output signal indicative of the number thereof;
   first reading means coupled with said storage medium for producing an output signal indicative of the negative frame number information encoded thereon;
   a coincidence detector having a first input coupled to said counter and a second input coupled to said first reading means, and an output, said detector being responsive to a coincidence of said counter output signal with said signal produced by said first reading means for producing a signal at the output thereof;
   second reading means coupled with said storage medium for producing a control signal indicative of the printer function information encoded therein; and
   a normally closed gate circuit having first and second inputs and outputs, said outputs being coupled to said controller, said second input being coupled to said second reading means, and said first input being coupled to the output of said coincidence circuit, said gate circuit normally blocking the passage of said control signal from said second reading means to said controller, said gate circuit being operative in response to an output signal from said coincidence detector to permit passage of said control signal from said second reading means to said controller.

3. In a system for cuing and actuating a controller by means of sets of information relating to a plurality of printer functions and the number of the negative frames at which they are to occur encoded on a tape, said controller controlling the functioning of a motion picture printer printing a positive print from a negative, the combination comprising:
   means for passing said negative through said printer;
   a counter for counting the negative frames entering said printer and producing an output signal indicative of the number thereof;
   a tape reader for reading said tape, said tape reader having first reading means for producing an output signal indicative of the negative frame number encoded in a first set of information on said tape and second reading means for producing a control signal indicative of the printer function encoded in said first set of information on said tape;
   a coincidence detector having a first input coupled to said counter and a second input coupled to said first reading means, and an output, said detector being responsive to a coincidence of said counter output signal with said signal produced by said first reading means for producing a signal at the output thereof; and
   a gate circuit having a first input coupled to said second reading means and an output coupled to said controller whereby said control signal can be passed from said second reading means to said controller, said gate circuit having a second input coupled to the output of said coincidence detector, said gate circuit being operative to block passage of said control signal from said second reading means to said controller when no signal is present at the output of said coincidence detector and being operative to pass said control signal when a signal is present at the output of said coincidence circuit.

4. The system of claim 3 wherein means are provided for advancing said tape in said tape reader to a second set of information in response to an output signal from said coincidence detector.

5. Apparatus for printing on rawstock from a length of pre-print film constituted by a series of scenes each having a preferred printing light level, said apparatus comprising means for exposing the rawstock to the pre-print film and including a controllable printing light source to adjust the strength of exposure, a source of information relating to said pre-print film, said information identifying the length of each scene on the pre-print film and the preferred printing light level for each scene, film transport means to transport the pre-print film through the first said means, signal generating means responsive to said film transport means to generate signals from which can be determined the amount of film transported through the first said means, scene detecting means coupled to said source of information and to said signal generating means to determine the completion of a scene and the beginning of the next scene, and control means coupled to said scene detecting means and to said source of information and utilizing said information upon a change in scene to control said printing light source to select the preferred printing light level for the next scene and to effect the latter said level for the length of the latter said scene.

6. Apparatus as claimed in claim 5, wherein said source of information includes a tape having two zones of information respectively related to scene length and scene lighting.

7. A method of printing on rawstock from a pre-print film comprising preparing a record of scene lengths relative to the pre-print film and of preferred printing light level relative to each scene, the scene lengths being recorded in respect of number of frames, and exposing the rawstock in a zone of exposure to the pre-print film with a controlled printing light level, the pre-print film being driven at a rate which is used to generate pulses numerically corresponding to the number of frames driven through the zone of exposure, counting said pulses and comparing the count with the record of scene lengths to determine the end of one scene and the beginning of the next scene, and adjusting printing light level in accordance with the record of preferred light level at the beginning of each scene.

8. A method as claimed in claim 7, wherein said pulses are generated independently of any information on said pre-print film.

* * * * *